(12) United States Patent
Seetharaman et al.

(10) Patent No.: US 12,212,236 B2
(45) Date of Patent: Jan. 28, 2025

(54) DC-DC CONVERTER CONTROL CIRCUIT

(71) Applicant: TEXAS INSTRUMENTS INCORPORATED, Dallas, TX (US)

(72) Inventors: Narayanan Seetharaman, Freising (DE); Puneet Sareen, Freising (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 300 days.

(21) Appl. No.: 17/853,287

(22) Filed: Jun. 29, 2022

(65) Prior Publication Data
US 2024/0006992 A1    Jan. 4, 2024

(51) Int. Cl.
*H02M 3/145* (2006.01)
*H02M 3/158* (2006.01)

(52) U.S. Cl.
CPC .................. *H02M 3/158* (2013.01)

(58) Field of Classification Search
CPC ...... H02M 3/145; H02M 3/155; H02M 3/156; H02M 3/158
See application file for complete search history.

(56) References Cited

U.S. PATENT DOCUMENTS

| | | | |
|---|---|---|---|
| 8,866,341 B2* | 10/2014 | Riederer | G05F 1/56 307/85 |
| 10,439,494 B2* | 10/2019 | Sharifi | H02M 3/158 |
| 2007/0052403 A1* | 3/2007 | Stoichita | H02M 3/156 323/288 |
| 2021/0083583 A1* | 3/2021 | Becker | H03K 5/24 |

* cited by examiner

*Primary Examiner* — Adolf D Berhane
(74) *Attorney, Agent, or Firm* — Charles F. Koch; Frank D. Cimino

(57) ABSTRACT

A DC-DC converter circuit includes an error amplifier, a comparator, an oscillator, and a control circuit. The error amplifier is configured to generate an error signal. The control circuit is coupled to the error amplifier, the comparator, and the oscillator. The control circuit is configured to generate an oscillator control signal to control a frequency of the oscillator based on the error signal, and to generate a peak control signal provided to the comparator based on the error signal. The control circuit is also configured to switch, based on the error signal, between a first modulation mode and a second modulation mode during a transition mode, and in the transition mode, generate the oscillator control signal based on the peak control signal and the error signal.

19 Claims, 9 Drawing Sheets

DC-DC CONVERTER CONTROL CIRCUIT

BACKGROUND

A DC-DC converter is an electronic circuit that converts an input direct current (DC) supply voltage into one or more DC output voltages that are higher or lower in magnitude than the input DC supply voltage. A DC-DC converter that generates an output voltage lower than the input voltage is termed a buck or step-down converter. A DC-DC converter that generates an output voltage higher than the input voltage is termed a boost or step-up converter. DC-DC converters are widely used to power electronic devices, particularly battery powered devices, such as portable cellular phones, laptop computers, and other electronic systems in which efficient use of power is desirable.

SUMMARY

In one example, a DC-DC converter control circuit includes a first current mirror circuit and a second current mirror circuit. The first current mirror circuit includes a control transistor, a first mirror transistor, and a second mirror transistor. The control transistor has an error amplifier current terminal. The first mirror transistor is coupled to the control transistor. The second mirror transistor is coupled to the control transistor. The second current mirror circuit includes a control transistor, a first mirror transistor, and a second mirror transistor. The control transistor of the second current mirror circuit is coupled to the first mirror transistor of the first current mirror circuit. The first mirror transistor of the second current mirror circuit is coupled to the control transistor of the second current mirror circuit, and has a peak control output. The second mirror transistor of the second mirror circuit is coupled to the control transistor of the second current mirror circuit and the second mirror transistor of the first current mirror circuit.

In another example, a DC-DC converter circuit includes an error amplifier, a comparator, an oscillator, and a control circuit. The error amplifier is configured to generate an error signal. The control circuit is coupled to the error amplifier, the comparator, and the oscillator. The control circuit is configured to generate an oscillator control signal to control a frequency of the oscillator based on the error signal, and to generate a peak control signal provided to the comparator based on the error signal. The control circuit is also configured to switch, based on the error signal, between a first modulation mode and a second modulation mode during a transition mode, and in the transition mode, generate the oscillator control signal based on the peak control signal and the error signal.

In a further example, a mobile device includes a DC-DC converter. The DC-DC converter includes an error amplifier, a comparator, an oscillator, and a control circuit. The error amplifier is coupled to an output of the power supply, and configured to generate an error signal. The comparator is configured to control switching of a power transistor. The oscillator is configured to control switching of the power transistor. The control circuit is coupled to the error amplifier, the comparator and the oscillator. The control circuit is configured to generate an oscillator control signal to control a frequency of the oscillator based on the error signal, and to generate a peak control signal provided to the comparator based on the error signal. The control circuit is also configured to switch, based on the error signal, between a first modulation mode and a second modulation mode during a transition mode; and in the transition mode, generate the oscillator control signal based on the peak control signal and the error signal.

DETAILED DESCRIPTION

To improve operational efficiency across a wide range of loads, a DC-DC converter may apply multiple operational modes. For example, a DC-DC converter may apply fixed frequency pulse width modulation (PWM) to efficiently power heavier loads, and apply pulse frequency modulation (PFM) to efficiently power lighter loads. In such DC-DC converters, a smooth transition between operational modes is desirable to ensure that there is no loss of control. A smooth transition between operational modes can be implemented by overlapping the control associated with the changing operational modes. However, overlapping control of different operational modes may increase gain in the converter's control loop and make the converter unstable in the overlap or transition region.

Examples of the DC-DC converter described herein provide improved stability when transitioning between control modes by reducing PFM control path gain in the overlap region. The DC-DC converter includes a control circuit that uses current mirrors to control PWM and PFM operation. The control circuit receives an output current error signal as input and generates frequency and current control signals as output. The current mirrors feedback less than 100% (e.g., 85%) of the current control output in a reverse direction to the frequency control output. In the overlap region, the feedback reduces control loop gain and improves converter stability.

Figure 1:
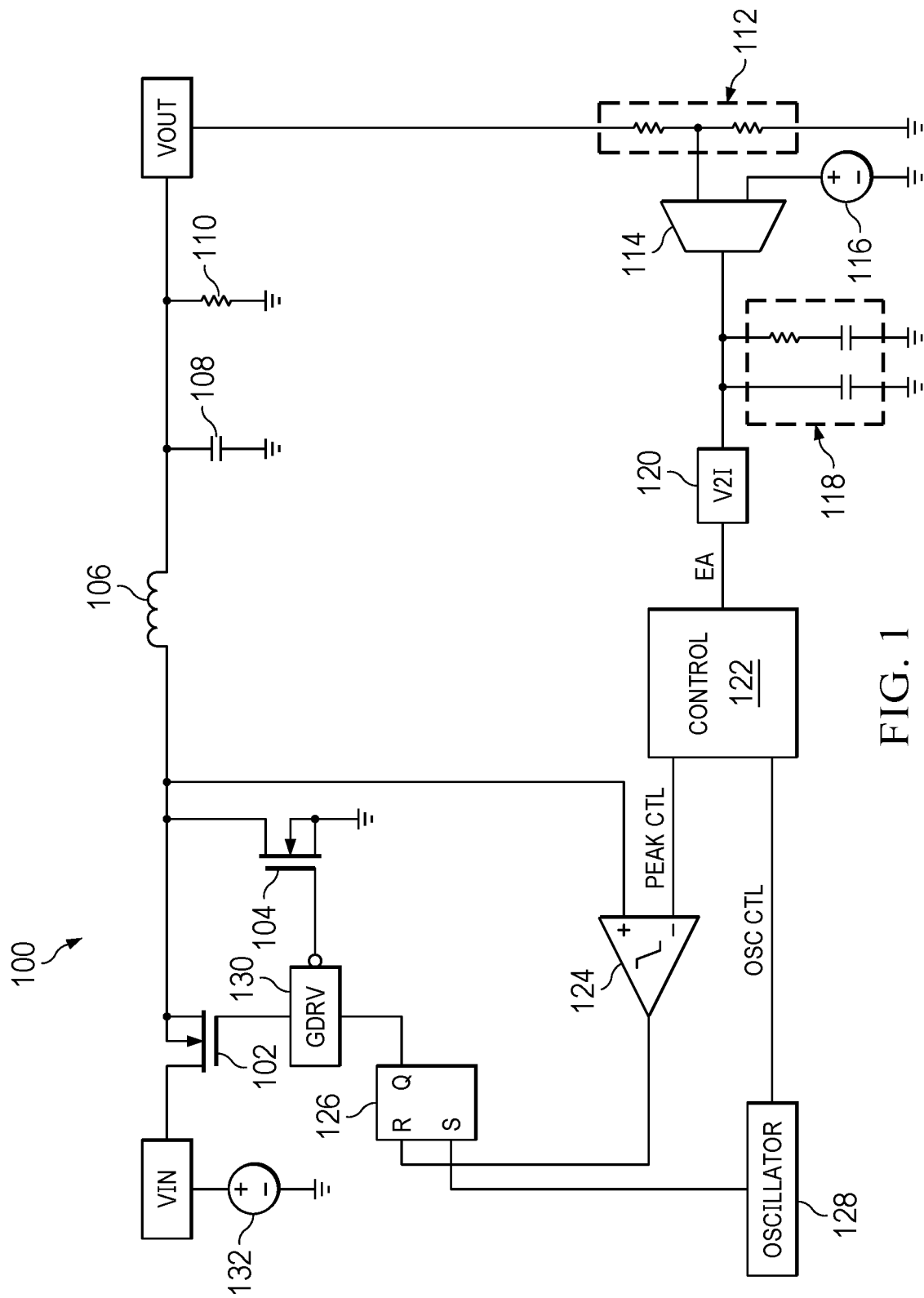
FIG. 1 is a block diagram of an example DC-DC converter that includes mode transition stabilization as described herein.

FIG. 1 is a block diagram of an example DC-DC converter 100 that includes mode transition stabilization as described herein. The DC-DC converter 100 is illustrated as a buck converter, but may be a boost converter, a buck-boost converter, or other type of DC-DC converter in some implementations. The DC-DC converter 100 includes a high-side switching transistor 102, a low-side switching transistor 104, an inductor 106, an output capacitor 108, a voltage divider 112, an error amplifier 114, a compensation network 118, a voltage-to-current converter 120, a control circuit 122, a comparator 124, a flip-flop 126, an oscillator 128, and a gate driver 130.

The high-side switching transistor 102 and the low-side switching transistor 104 are coupled to the inductor 106, and are complementarily activated to charge the inductor 106 from the voltage source 132, and to discharge the inductor 106 into the output capacitor 108 and the load 110. The gate driver 130 is coupled to the high-side switching transistor 102 and the low-side switching transistor 104, and provides control signals with voltages and currents suitable for driving the gates of the high-side switching transistor 102 and the low-side switching transistor 104. The inductor 106 is coupled to the output capacitor 108, and current flowing from the inductor 106 charges the output capacitor 108 to power the load 110. The voltage divider 112 is coupled to the inductor 106 and the output capacitor 108. The voltage divider 112 divides the output voltage (VOUT) of the DC-DC converter 100 for comparison to a reference voltage generated by a voltage source 116. The error amplifier 114 is coupled to the voltage divider 112 and the voltage source 116, and generates an error signal representing the difference of the reference voltage received from the voltage source 116 and the divided output of the DC-DC converter 100. The output of the error amplifier 114 is coupled to the compensation network 118 and the voltage-to-current converter 120. The compensation network 118 adjusts the phase of the error signal to stabilize the control loop of the DC-DC converter 100. The voltage-to-current converter 120 converts the error signal received from the error amplifier 114 to a current (EA). The voltage-to-current converter 120 is coupled to the control circuit 122.

The control circuit 122 applies EA to operate the DC-DC converter 100 in a PWM mode and a PFM mode. The PWM mode is active to power smaller values of the load 110 (larger loads), and the PFM mode is active to power larger values of the load 110 (lighter loads). The control circuit 122 includes a first output coupled to the comparator 124, and a second output coupled to the oscillator 128. The comparator 124 compares a peak control signal (PEAK CTL) received from the control circuit 122 to current sensed in the inductor 106. When the sensed current exceeds the threshold defined by the peak control signal, the flip-flop 126 deactivates the high-side switching transistor 102 and activates the low-side switching transistor 104. The oscillator 128 generates a clock signal for timing activation of the high-side switching transistor 102 and deactivation of the low-side switching transistor 104. The frequency of the clock signal is determined by the oscillator control signal (OSC CTL) received from the control circuit 122.

In PWM mode, the control circuit 122 holds the oscillator control signal (OSC CTL) at a constant value to cause the oscillator 128 to produce a fixed clock frequency output, and varies the peak control signal (PEAK CTL) provided to the comparator 124 based on EA. In PFM mode, the control circuit 122 holds the peak control signal at a constant value to produce a constant current threshold, and varies the oscillator control signal change the frequency of the clock signal provided to the flip-flop 126. In a transition mode (when transitioning between PWM and PFM modes), both PFM mode and PWM mode are active in an overlap region. Accordingly, during the transition mode, the control circuit 122 may change both the oscillator control signal and the peak control signal to change both the clock frequency and the current threshold. To stabilize the control loop of the DC-DC converter 100, in the transition mode, the control circuit 122 reduces control loop gain by limiting the slope (the rate of change of the oscillator control signal) to a value that is less than that applied when operating in PFM mode.

Figure 2:
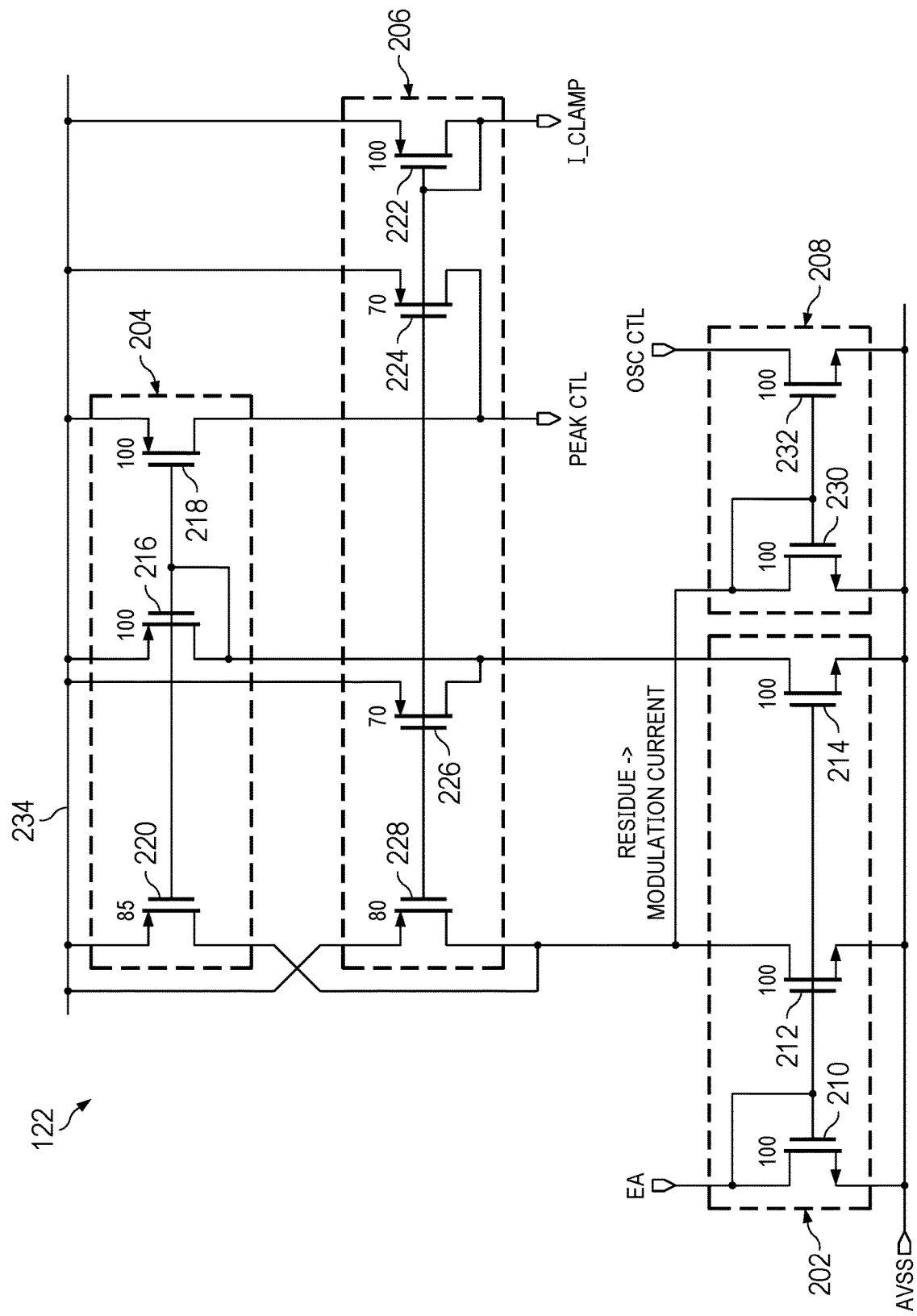
FIG. 2 is a schematic level diagram of an example control circuit for controlling transition between modulation modes in the DC-DC converter of FIG. 1.

FIG. 2 is a schematic level diagram of an example control circuit 122 for controlling transition between modulation modes in the DC-DC converter 100. The control circuit 122 includes a current mirror circuit 202, a current mirror circuit 204, a current mirror circuit 206, and a current mirror circuit 208. The current mirror circuit 202 provides for generation of the peak control signal and the oscillator control signal based on EA. The current mirror circuit 202 includes a control transistor 210, a mirror transistor 212, and a mirror transistor 214. The control transistor 210, the mirror transistor 212, and the mirror transistor 214 may be n-channel field effect transistors. The drain (error amplifier current terminal) and the gate of the control transistor 210 are coupled to the output of the voltage-to-current converter 120 for receipt of EA. The source of the control transistor 210 is coupled to a ground. The gate of the control transistor 210 is coupled to the gate of the mirror transistor 212 and the gate of the mirror transistor 214. The drain of the mirror transistor 212 is coupled to the current mirror circuit 206. The drain of the mirror transistor 214 is coupled to the current mirror circuit 204. The source of the mirror transistor 212 and the source of the mirror transistor 214 are coupled to ground.

The current mirror circuit 204 is coupled to the current mirror circuit 202 and the current mirror circuit 206. The current mirror circuit 204 outputs the peak control signal. The current mirror circuit 204 includes a control transistor 216, a mirror transistor 218, and a mirror transistor 220. The control transistor 216, the mirror transistor 218, and the mirror transistor 220 may be p-channel field effect transistors. The source of the control transistor 216, the source of the mirror transistor 218, and the source of the mirror transistor 220 are coupled to a power supply terminal 234. The drain and the gate of the control transistor 216 are coupled to the drain of the mirror transistor 214. The gate of the control transistor 216 is coupled to the gate of the mirror transistor 218, and the gate of the mirror transistor 220. The peak control signal is provided at the drain of the mirror transistor 218, and the drain of the mirror transistor 218 (peak control output) is coupled to the comparator 124. The drain of the mirror transistor 220 is coupled to the drain of the mirror transistor 212.

The control transistor 216 and the mirror transistor 218 may be equally sized. For example, the drain-source channel width of the control transistor 216 and the mirror transistor 218 may be the same. The mirror transistor 220 may be smaller than the control transistor 216 or the mirror transistor 218. For example, the channel width of the mirror transistor 220 may be 85% of the channel width of the control transistor 216 or the mirror transistor 218. In FIG. 2, an example percentage value for channel width relative to the channel width of the control transistor 216 is provided for each transistor (e.g., the mirror transistor 220 channel width may be 85% of the channel width of the control transistor 216 as indicated by the value "85" associated with the mirror transistor 220).

The current mirror circuit 206 is coupled to the current mirror circuit 202 and the current mirror circuit 204. The current mirror circuit 206 includes a control transistor 222, a mirror transistor 224, a mirror transistor 226, and a mirror transistor 228. The control transistor 222, the mirror transistor 224, the mirror transistor 226, and the mirror transistor 228 may be p-channel field effect transistors. The source of the control transistor 222, the source of the mirror transistor 224, the source of the mirror transistor 226, and the source of the mirror transistor 228 are coupled to the power supply terminal 234. The gate and drain (reference current terminal) of the control transistor 222 are coupled to a current reference circuit, such as a bandgap reference circuit, to draw a clamp current through the control transistor 222. The gate of the control transistor 222 is coupled to the gate of the mirror transistor 224, the gate of the mirror transistor 226, and the gate of the mirror transistor 228. The drain of the mirror transistor 224 is coupled to the drain of the mirror transistor 218. The drain of the mirror transistor 226 is coupled to the drain of the control transistor 216. The drain of the mirror transistor 228 is coupled to the drain of the mirror transistor 212.

The channel width of the mirror transistor 224, the channel width of the mirror transistor 226, and the channel width of the mirror transistor 228 may be smaller (e.g., 70%) of the channel width of the of the control transistor 222. The peak control signal is formed as the greater of EA and 70% of the clamp current.

The current mirror circuit 208 includes a control transistor 230 and a mirror transistor 232. The control transistor 230 and the mirror transistor 232 may n-channel field effect transistors. The source of the control transistor 230 and the source of the mirror transistor 232 are coupled to ground. The gate and the drain of the control transistor 230 are coupled to the drain of the mirror transistor 212. The control transistor 230 passes a residue current from the mirror transistor 220 and the mirror transistor 228 (current that is not passed by (bypasses) the mirror transistor 212) to form the oscillator control signal. In sum, the current mirror circuit 208 receives the difference of EA and the currents flowing from the mirror transistors 220 and 228 to generate the oscillator control signal. The gate of the control transistor 230 is coupled to the gate of the mirror transistor 232. The oscillator control signal is an oscillator frequency control signal and is provided at the drain of the mirror transistor 232, and the drain (oscillator current terminal) of the mirror transistor 232 is coupled to the oscillator 128.

Figure 3A:
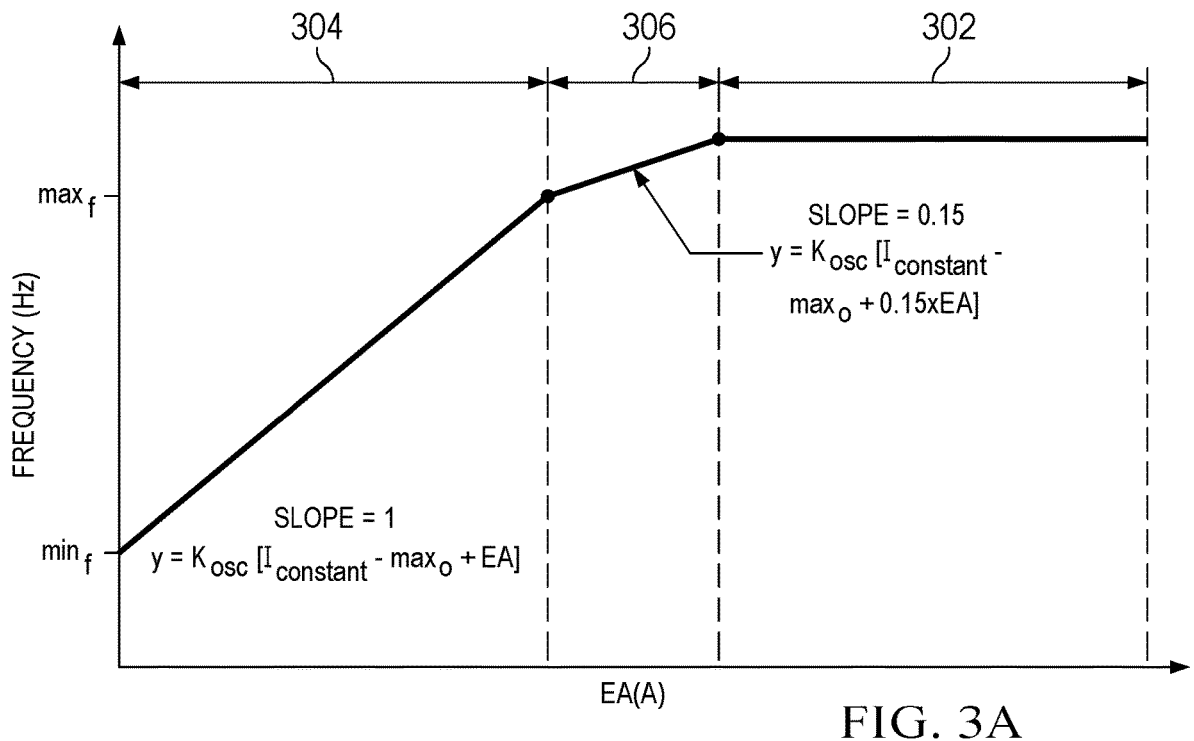
FIGS. 3A and 3B are graphs of example switching frequency in a DC-DC converter with and without the control circuit of FIG. 2.
Figure 3B:
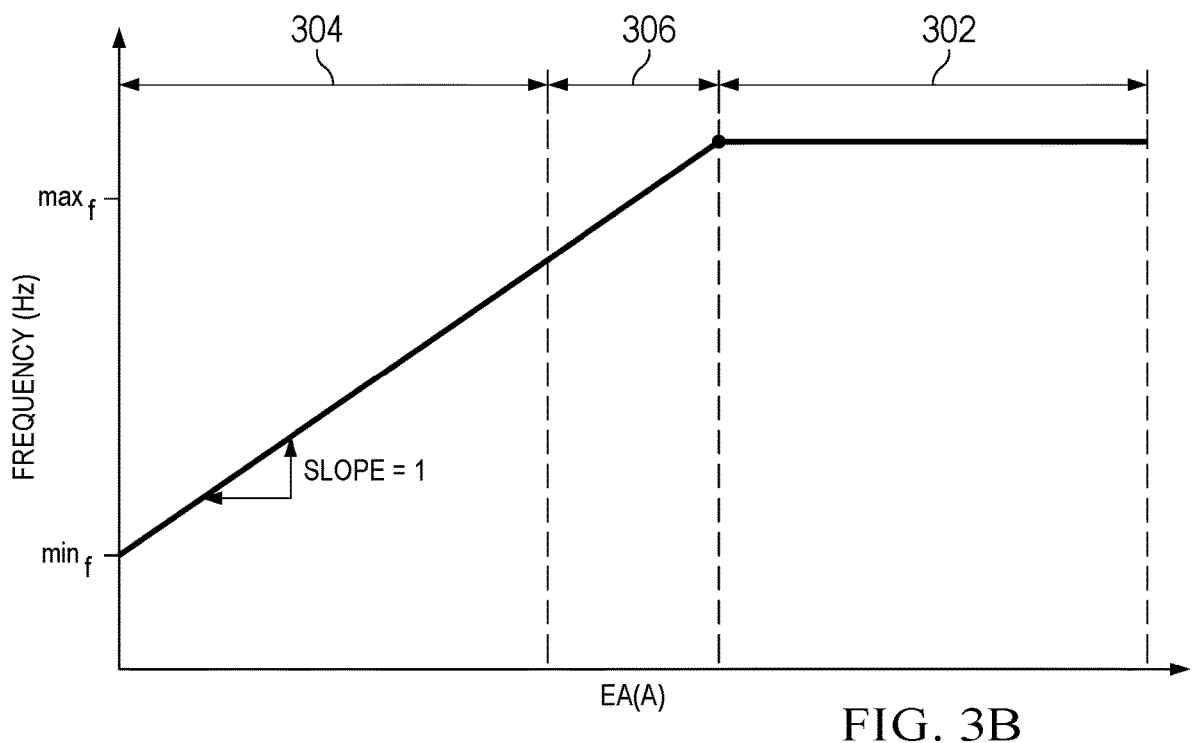

FIGS. 3A and 3B are graphs of example switching frequency in a DC-DC converter with and without the control circuit 122. FIG. 3A is a graph of oscillator frequency versus error signal (EA) in the control circuit 122. FIG. 3B is a graph of oscillator frequency versus error signal in a DC-DC converter that lacks the control circuit 122. In the region 302, the DC-DC converters are operating in PWM mode with a fixed oscillator frequency. EA is greater than a first predetermined percentage (e.g., 80%) of the clamp current (current flowing through the control transistor 222). All of the current flowing through the mirror transistor 228 and the mirror transistor 220 flows through the mirror transistor 212, and no current flows through the control transistor 230 and the mirror transistor 232. Thus, the oscillator control signal is fixed at zero current, which fixes the output of the oscillator 128 at a maximum frequency.

In the region 304, the DC-DC converters are operating in PFM mode with a variable oscillator frequency. EA is less than a second predetermined percentage (e.g., a selected percentage, such as 70%) of the clamp current (current flowing through the control transistor 222). Current flowing through the mirror transistor 220 and the mirror transistor 228 that is not shunted to ground through the mirror transistor 212, flows through the control transistor 230 to increase the current flowing in the mirror transistor 232 as the oscillator control signal, and change the frequency of the oscillator 128 based on EA.

In the region 306, the DC-DC converters are operating in a mode that overlaps PWM and PFM modes. EA is between the first predetermined percentage and the second predetermined percentage (e.g., between 70% and 80%) of the clamp current. In regions 304 and 306 of FIGS. 3A and 3B, oscillator frequency increases with the error signal as:

$$\text{Frequency} = K_{OSC}[I_{const} - OSC\_CTL]$$

where:
$K_{OSC}$ is oscillator gain factor in Hertz per ampere.
In the region 304 of FIGS. 3A and 3B, and the region 306 of the FIG. 3B, $$OSC_{CTL} = \max_0 - EA$$

where:
$\max_0$ is maximum oscillator control current.
In the region 306 of FIG. 3A:

$$OSC_{CTL} = \max_0 - 0.15 EA$$

The reduced influence of EA on the oscillator frequency provided by the voltage divider 112 (and illustrated in region 306 of FIG. 3A) reduces the gain in the overlap region to stabilize the DC-DC converter during the transition between PFM and PWM modes.

Figure 4A:
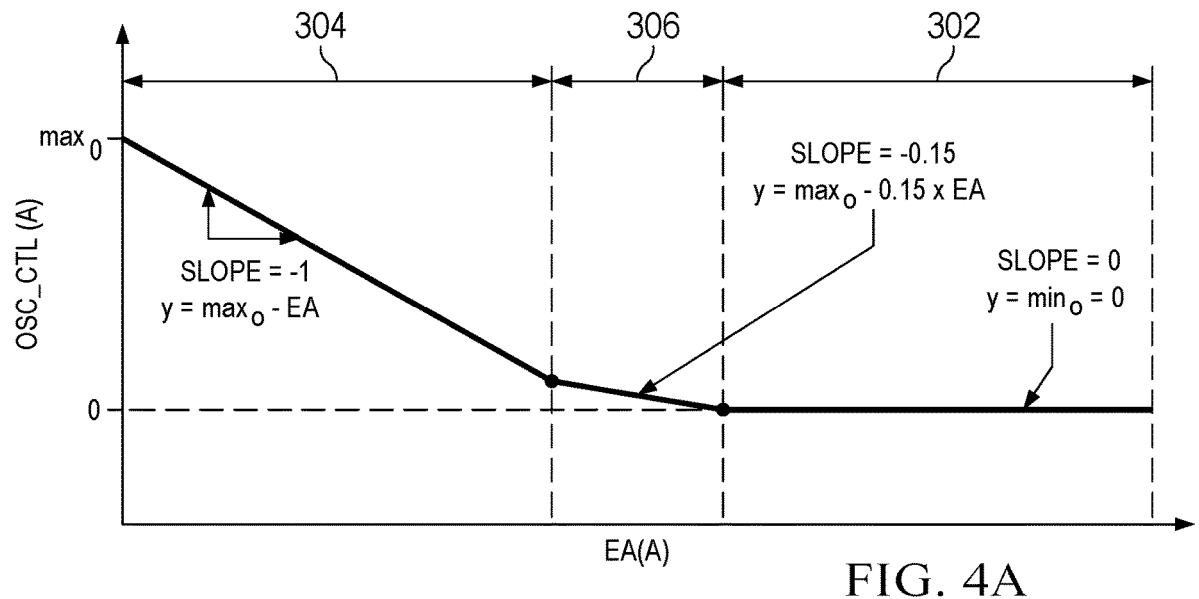
FIGS. 4A and 4B are graphs of example oscillator control current in a DC-DC converter with and without the control circuit of FIG. 2.
Figure 4B:
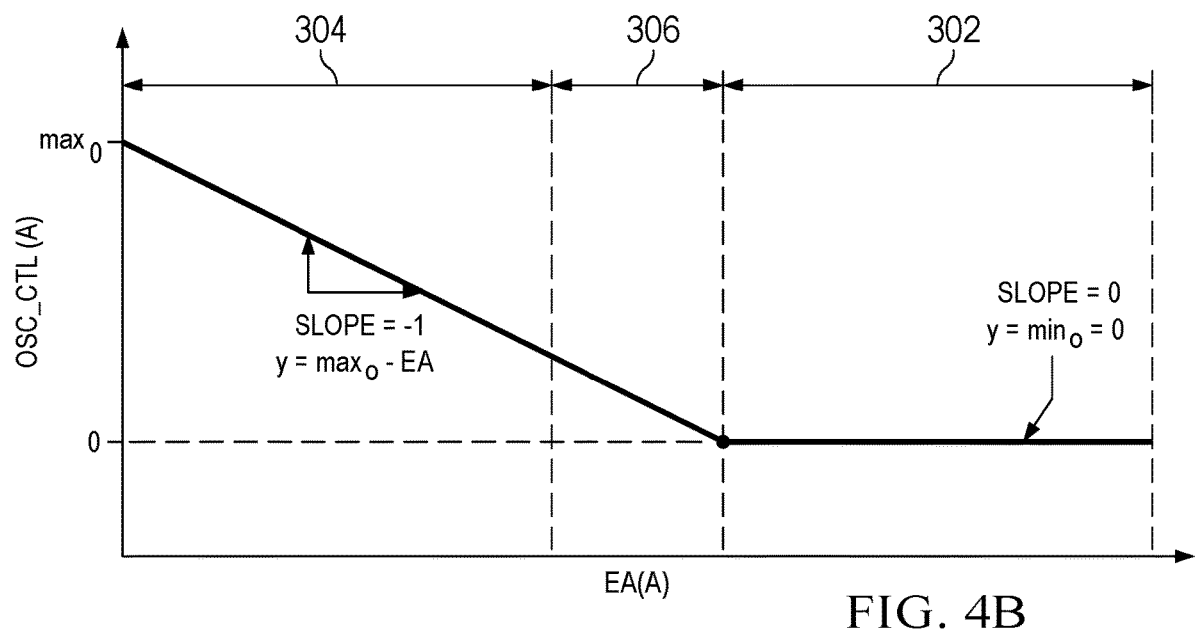

FIGS. 4A and 4B are graphs of example oscillator control currents with and without the control circuit 122. In FIG. 4B, the oscillator control current drops as $\max_0 - EA$ through regions 304 and 306. Thus, in FIG. 4B, (without the control circuit 122) the rate of change in the oscillator control current is the same in regions in 304 (PFM mode) and 306 (overlap mode). In the region 302 (PWM mode), the oscillator control current is at a minimum value (e.g., zero).

In FIG. 4A, through region 304, the oscillator control current drops as $\max_0 - EA$ (the same as in FIG. 4B). In the region 306, the rate of change in the oscillator control current is reduced as $\max_0 - 0.15 EA$. The reduced influence of EA on the oscillator control current reduces the gain in the overlap region to stabilize the DC-DC converter during the transition between PFM and PWM modes.

Figure 5:
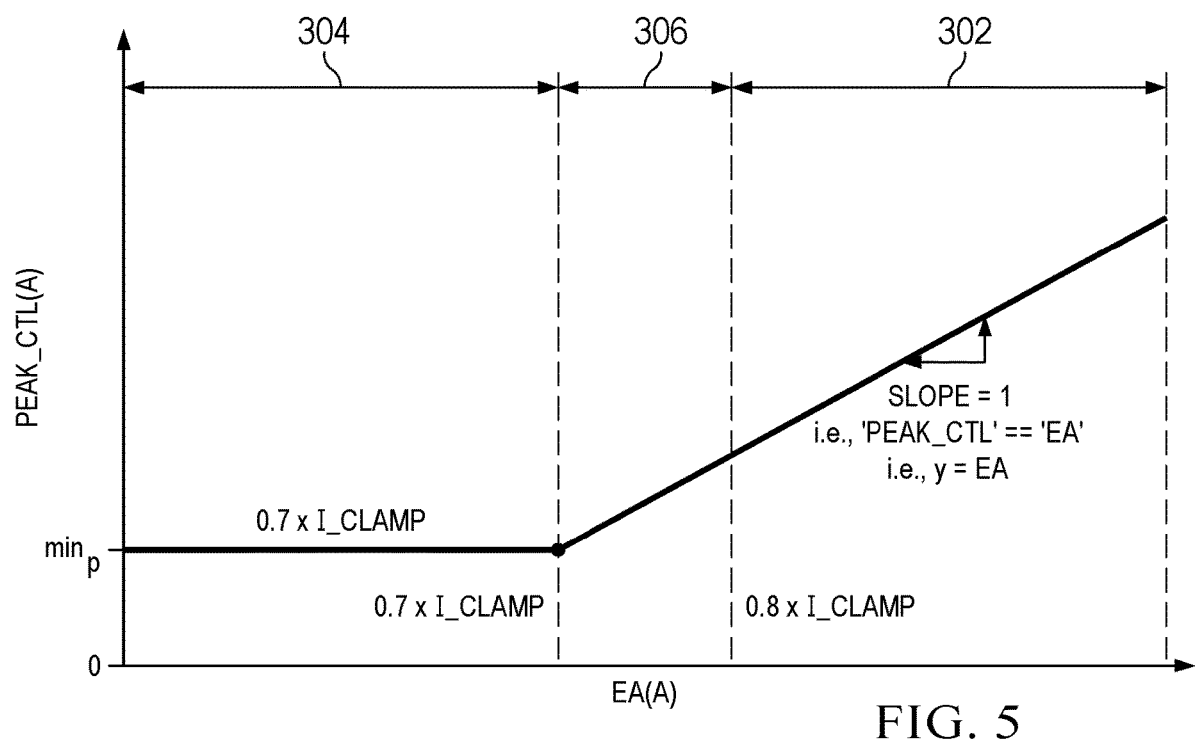
FIG. 5 is a graph of example peak control current in a DC-DC converter with the control circuit of FIG. 2.

FIG. 5 is a graph of example peak control current in the control circuit 122. In the region 302 (PWM mode) and the region 306 (overlap mode), peak control current follows EA. In PFM mode, the peak control signal is clamped to the first predetermined percentage (e.g., 70%) of the clamp current flowing in the control transistor 222.

Figure 6:
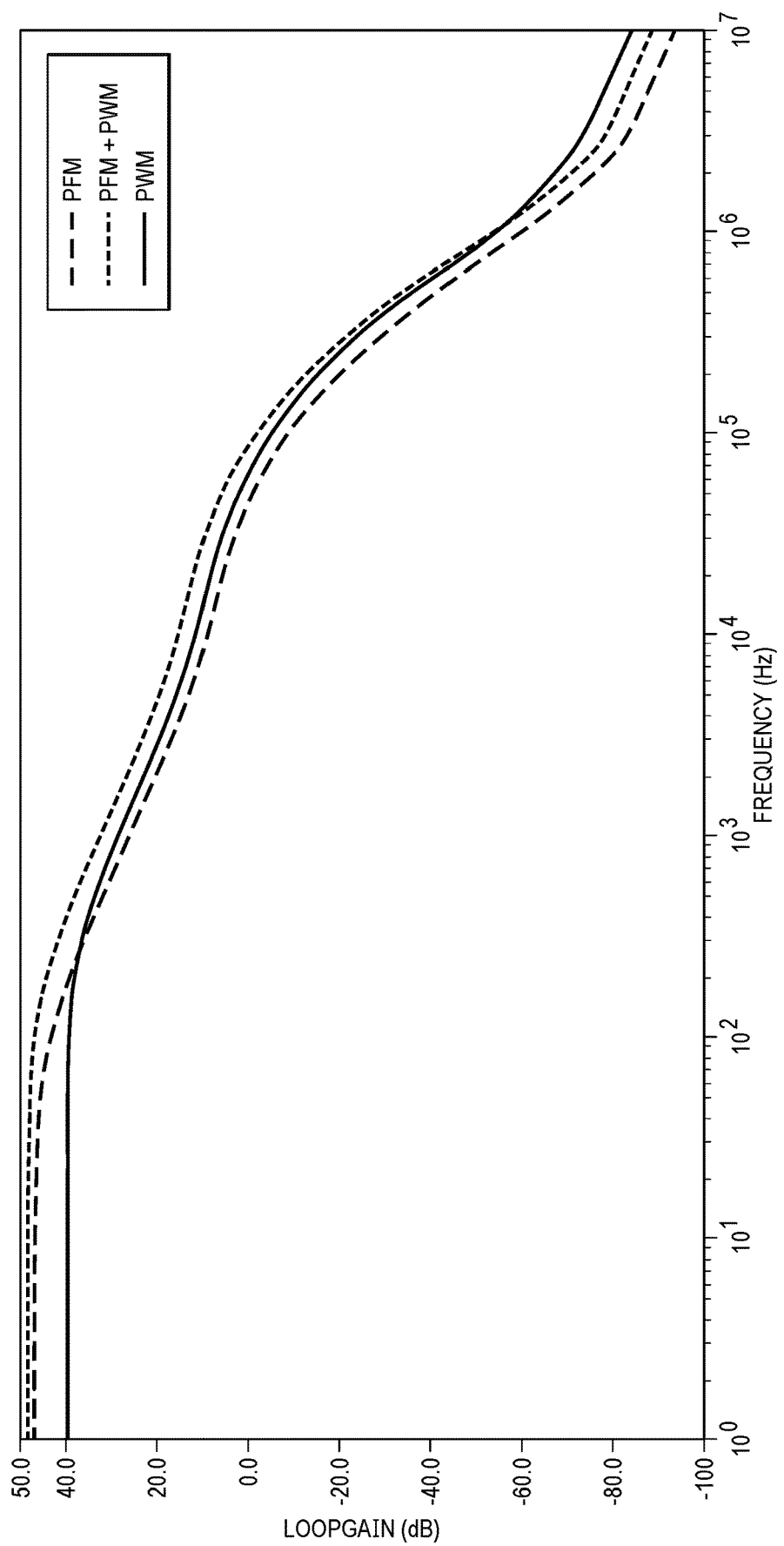
FIG. 6 is a graph of loop gain in an example DC-DC converter that lacks the transition mode gain control described herein.

FIG. 6 is a graph of loop gain in an example DC-DC converter that lacks gain control in transition mode. FIG. 6 shows that loop gain when operating in the transition mode (in the overlap region 306) is substantially higher than when operating in the PWM mode or the PFM mode.

Figure 7:
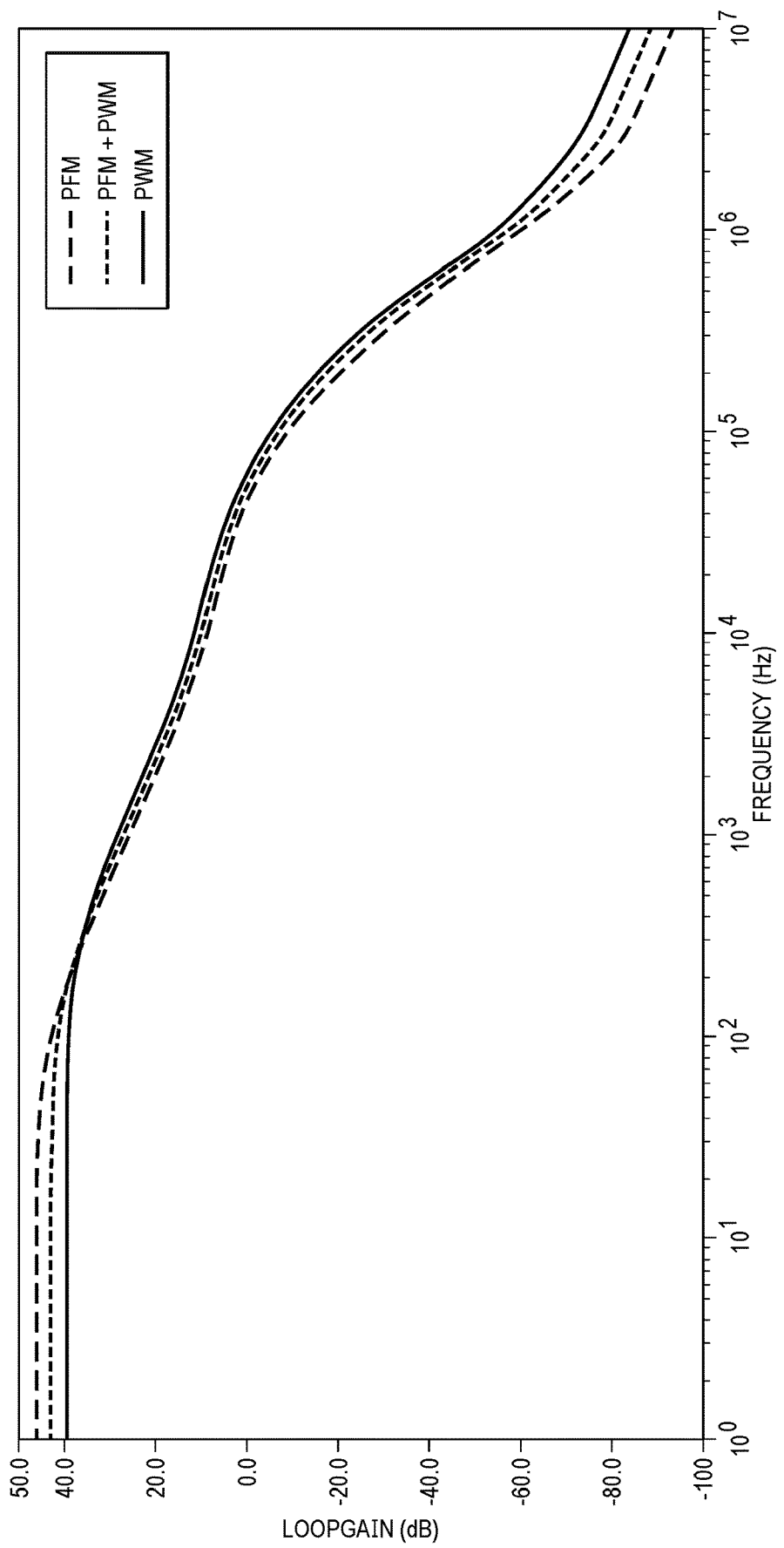
FIG. 7 is a graph of loop gain in the DC-DC converter of FIG. 1.

FIG. 7 is a graph of loop gain in the DC-DC converter 100. The control circuit 122 substantially reduces the loop gain to stabilize the DC-DC converter 100 when transitioning between PWM and PFM modes.

Figure 8A:
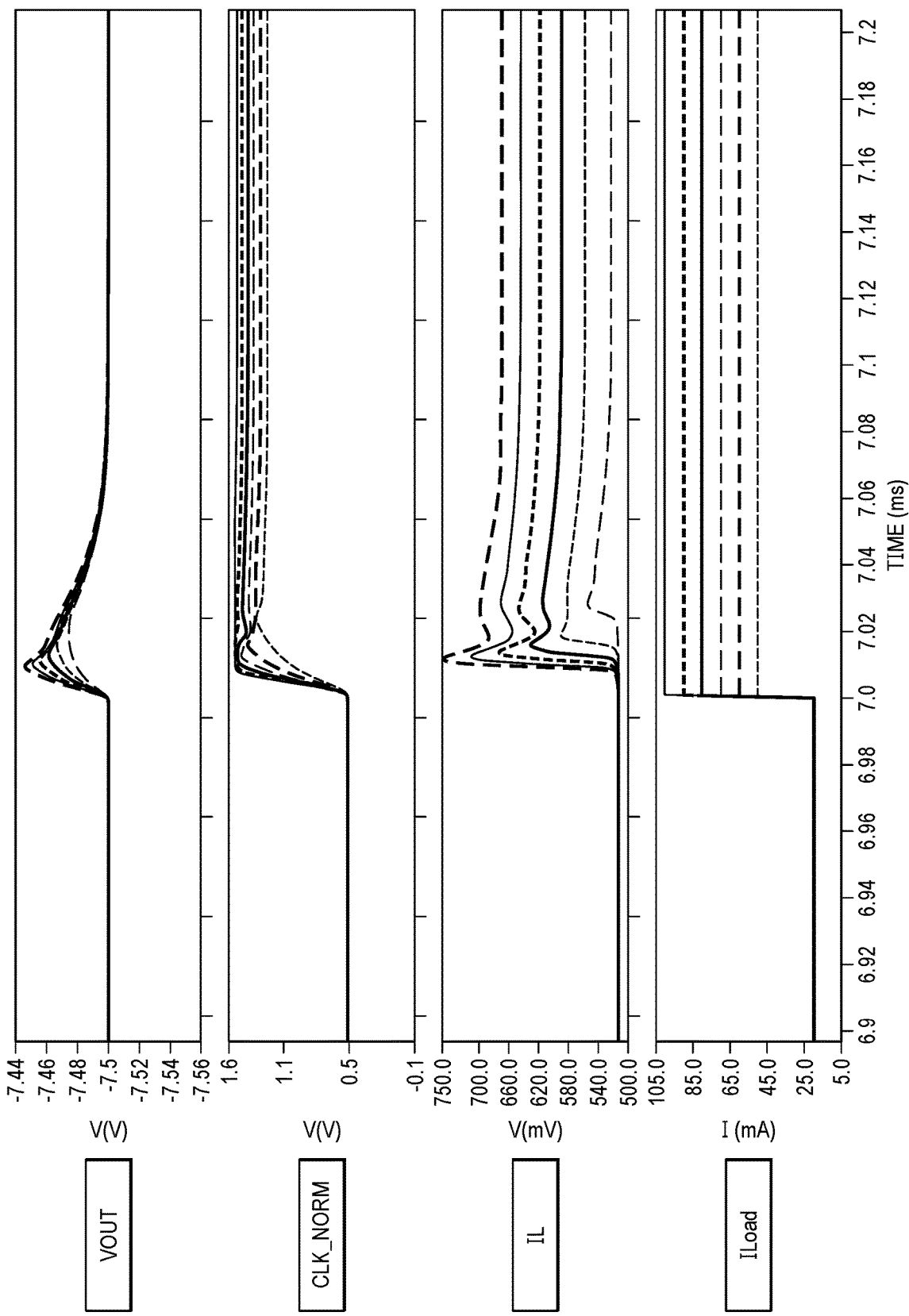
FIGS. 8A and 8B are graphs showing examples of transient performance of the DC-DC converter of FIG. 1 and of a DC-DC converter that lacks mode transition stabilization.

FIG. 8A is a graph of transient performance of the DC-DC converter 100. FIG. 8A shows load current (ILoad) transitions from 20 milliamperes (ma) to 100 ma, and various intermediate values. The response of inductor current (IL), clock control signal (CLK_NORM), and output voltage (VOUT) to the change in load current are also shown in FIG. 8A. FIG. 8A shows that with the control circuit 122, the inductor current, clock control signal, and output voltage settle quickly with no ringing responsive to the load transition.

Figure 8B:
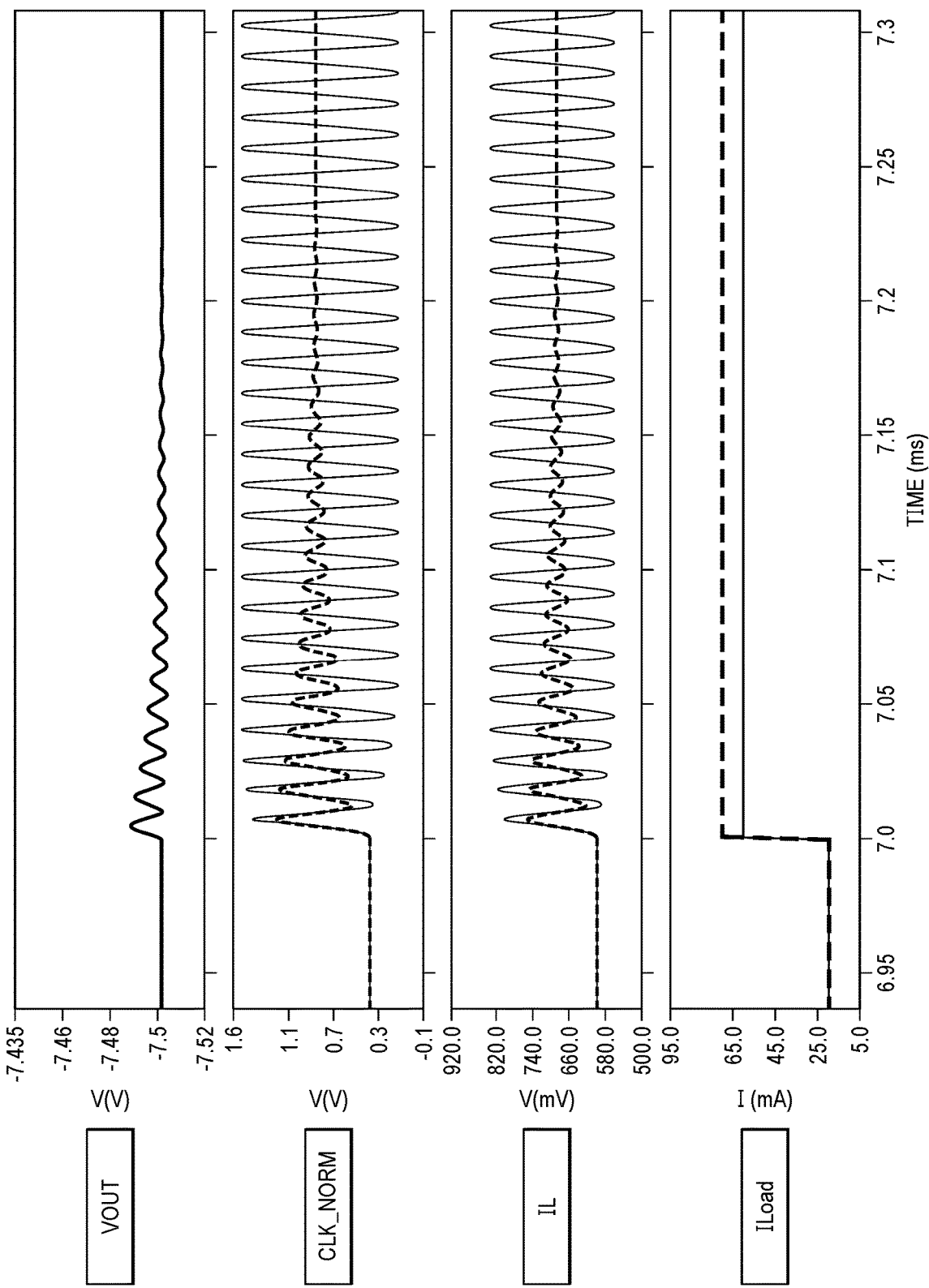

FIG. 8B is a graph showing examples of transient performance of a DC-DC converter that lacks mode transition stabilization. FIG. 8B shows load current (ILoad) transitions from 20 milliamperes (ma) to 60 ma and 70 ma. The response of inductor current (IL), clock control signal (CL- K_NORM), and output voltage (VOUT) to the change in load current are also shown in FIG. 8B. FIG. 8B shows that without mode transition stabilization the inductor current, clock control signal, and output voltage ring excessively responsive to the load transition.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

While the use of particular transistors is described herein, other transistors (or equivalent devices) may be used instead. For example, a p-channel field effect transistor ("PFET") may be used in place of an n-channel field effect transistor ("NFET") with little or no changes to the circuit. Furthermore, other types of transistors may be used (such as bipolar junction transistors (BJTs)).

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to include additional or different components to provide functionality at least partially similar to functionality available prior to the component replacement. Components shown as transistors, unless otherwise stated, are generally representative of any one or more transistors coupled in parallel to provide desired channel width or emitter size.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter.

Modifications are possible in the described embodiments, and other embodiments are possible, within the scope of the claims.

What is claimed is:

1. A DC-DC converter control circuit, comprising:
    a first current mirror circuit including:
        a control transistor having an error amplifier current terminal;
        a first mirror transistor coupled to the control transistor; and
        a second mirror transistor coupled to the control transistor;
    a second current mirror circuit including:
        a control transistor coupled to the first mirror transistor of the first current mirror circuit;
        a first mirror transistor coupled to the control transistor of the second current mirror circuit, and having a peak control output; and
        a second mirror transistor coupled to the control transistor of the second current mirror circuit and the second mirror transistor of the first current mirror circuit; and
    a third current mirror circuit including:
        a control transistor having a reference current terminal;
        a first mirror transistor coupled to the control transistor of the third current mirror circuit and the first mirror transistor of the first current mirror circuit;
        a second mirror transistor coupled to the control transistor of the third current mirror circuit and the second mirror transistor of the first current mirror circuit; and
        a third mirror transistor coupled to the control transistor of the third current mirror circuit and the first mirror transistor of the second current mirror circuit.

2. The DC-DC converter control circuit of claim 1, wherein:
    the first mirror transistor of the third current mirror circuit is configured to pass a current that is smaller than the current passed by the control transistor of the third current mirror circuit;
    the second mirror transistor of the third current mirror circuit is configured to pass a current that is smaller than the current passed by the control transistor of the third current mirror circuit and larger than the current passed by the first mirror transistor; and
    the third mirror transistor of the third current mirror circuit is configured to pass a current that is smaller than the current passed by the control transistor of the third current mirror circuit.

3. The DC-DC converter control circuit of claim 1, wherein a current flowing through the first mirror transistor of the third current mirror circuit is an oscillator frequency control signal.

4. The DC-DC converter control circuit of claim 1, further comprising:
    a fourth current mirror circuit including:
        a control transistor coupled to the second mirror transistor of the first current mirror circuit; and
        a first mirror transistor coupled to the control transistor of the fourth current mirror circuit and having an oscillator current terminal.

5. The DC-DC converter control circuit of claim 1, wherein:
    the first mirror transistor of the second current mirror circuit is configured to pass a current of a same magnitude as a current passed by the control transistor of the second current mirror circuit; and the second mirror transistor of the second current mirror circuit is configured to pass a current that is smaller than the current passed by the control transistor of the second current mirror circuit.

6. A DC-DC converter circuit, comprising:
an error amplifier configured to generate an error signal;
a comparator;
an oscillator; and
a control circuit coupled to the error amplifier, the comparator and the oscillator, and configured to:
   generate an oscillator control signal to control a frequency of the oscillator based on the error signal;
   generate a peak control signal provided to the comparator based on the error signal;
   switch, based on the error signal, between a first modulation mode and a second modulation mode during a transition mode, wherein a rate of change for the oscillator control signal in the second modulation mode is a first value; and
   in the transition mode: generate the oscillator control signal based on the peak control signal and the error signal, wherein the rate of change for the oscillator control signal in the transition mode is limited to a second value that is less than the first value.

7. The DC-DC converter circuit of claim 6, wherein the control circuit is configured to: change the peak control signal and the oscillator control signal during the transition mode.

8. The DC-DC converter circuit of claim 6, wherein:
the first modulation mode is pulse width modulation; and
the second modulation mode is pulse frequency modulation.

9. The DC-DC converter circuit of claim 6, wherein the control circuit includes:
a first current mirror circuit including:
   a control transistor configured to pass the error signal;
   a first mirror transistor coupled to the control transistor; and
   a second mirror transistor coupled to the control transistor; and
a second current mirror circuit including:
   a control transistor configured to pass a peak control current to the first mirror transistor of the first current mirror circuit;
   a first mirror transistor coupled to the control transistor and configured to pass the peak control signal to the comparator; and
   a second mirror transistor coupled to the control transistor and configured to pass a selected percentage of the of the peak control current to the second mirror transistor of the first current mirror circuit.

10. The DC-DC converter circuit of claim 9, wherein the selected percentage of the peak control current is less than 100% of the peak control current.

11. The DC-DC converter circuit of claim 9, wherein control circuit includes:
a third current mirror circuit including:
   a control transistor configured to pass a clamp current;
   a first mirror transistor coupled to the control transistor of the third current mirror circuit, and configured to pass a first percentage of the clamp current to the first mirror transistor of the first current mirror circuit;
   a second mirror transistor coupled to the control transistor of the third current mirror circuit, and configured to pass a second percentage of the clamp current to the second mirror transistor of the first current mirror circuit; and
   a third mirror transistor coupled to the control transistor of the third current mirror circuit and configured to pass the first percentage of the clamp current to the comparator.

12. The DC-DC converter circuit of claim 11, wherein:
the first percentage of the clamp current is less than 100% of the clamp current; and
the second percentage of the clamp current is less than 100% of the clamp current and more than the first percentage of the clamp current.

13. The DC-DC converter circuit of claim 9, wherein the control circuit includes:
a third current mirror circuit including:
   a control transistor configured to pass a residue current that bypasses the second mirror transistor of the first current mirror circuit; and
   a first mirror transistor coupled to the control transistor and coupled to the oscillator.

14. The DC-DC converter circuit of claim 13, wherein the residue current is the oscillator control signal.

15. A mobile device, comprising:
a DC-DC converter, including:
   an error amplifier coupled to an output of the DC-DC converter, and configured to generate an error signal;
   a comparator configured to control switching of a power transistor;
   an oscillator configured to control switching of the power transistor;
   a control circuit coupled to the error amplifier, the comparator and the oscillator, and configured to:
      generate an oscillator control signal to control a frequency of the oscillator based on the error signal;
      generate a peak control signal provided to the comparator based on the error signal;
      switch, based on the error signal, between a first modulation mode and a second modulation mode during a transition mode, wherein a rate of change for the oscillator control signal in the second modulation mode is a first value; and
      in the transition mode: generate the oscillator control signal based on the peak control signal and the error signal, wherein the rate of change for the oscillator control signal in the transition mode is limited to a second value that is less than the first value.

16. The mobile device of claim 15, wherein:
the first modulation mode is pulse width modulation; and
the second modulation mode is pulse frequency modulation.

17. The mobile device of claim 15, wherein the control circuit includes:
a first current mirror circuit including:
   a control transistor configured to pass the error signal;
   a first mirror transistor coupled to the control transistor; and
   a second mirror transistor coupled to the control transistor; and
a second current mirror circuit including:
   a control transistor configured to pass a peak control current to the first mirror transistor of the first current mirror circuit;

a first mirror transistor coupled to the control transistor and configured to pass the peak control signal to the comparator; and a second mirror transistor coupled to the control transistor and configured to pass a selected percentage of the of the peak control current to the second mirror transistor of the first current mirror circuit.

18. The mobile device of claim 17, wherein the control circuit includes:

a third current mirror circuit including:

a control transistor configured to pass a clamp current;

a first mirror transistor coupled to the control transistor of the third current mirror circuit, and configured to pass a first percentage of the clamp current to the first mirror transistor of the first current mirror circuit;

a second mirror transistor coupled to the control transistor of the third current mirror circuit, and configured to pass a second percentage of the clamp current to the second mirror transistor of the first current mirror circuit; and a third mirror transistor coupled to the control transistor of the third current mirror circuit and configured to pass the first percentage of the clamp current to the comparator.

19. The mobile device of claim 17, wherein the control circuit includes:

a third current mirror circuit including:

a control transistor configured to pass a residue current that bypasses the second mirror transistor of the first current mirror circuit; and a first mirror transistor coupled to the control transistor and coupled to the oscillator.

* * * * *